US009481211B2

(12) United States Patent
Ochi et al.

(10) Patent No.: US 9,481,211 B2
(45) Date of Patent: Nov. 1, 2016

(54) PNEUMATIC TIRE

(71) Applicant: BRIDGESTONE CORPORATION, Chuo-ku, Tokyo (JP)

(72) Inventors: Naoya Ochi, Higashimurayama (JP); Kento Hashimoto, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 155 days.

(21) Appl. No.: 14/342,673

(22) PCT Filed: Sep. 28, 2012

(86) PCT No.: PCT/JP2012/006245
§ 371 (c)(1),
(2) Date: Mar. 4, 2014

(87) PCT Pub. No.: WO2013/046717
PCT Pub. Date: Apr. 4, 2013

(65) Prior Publication Data
US 2014/0224394 A1    Aug. 14, 2014

(30) Foreign Application Priority Data

Sep. 28, 2011  (JP) ................................ 2011-212889
Nov. 30, 2011  (JP) ................................ 2011-262689

(51) Int. Cl.
*B60C 11/03* (2006.01)
*B60C 11/12* (2006.01)
(Continued)

(52) U.S. Cl.
CPC ........ *B60C 11/0306* (2013.04); *B60C 11/0304* (2013.04); *B60C 11/1236* (2013.04);
(Continued)

(58) Field of Classification Search
CPC ........... B60C 11/0304; B60C 11/0306; B60C 11/0309; B60C 11/032; B60C 2011/0339; B60C 2011/0341; B60C 2011/0358; B60C 2011/0372; B60C 2011/0374; B60C 2011/0376; B60C 5011/0379; B60C 2011/0381; B60C 2011/0383; B60C 2011/0386; B60C 2011/0388; B60C 11/11; B60C 2011/1245; B60C 2011/0369; B60C 11/1369; B60C 11/1236; B60C 2011/1213; B60C 2011/1209
USPC ........................... 162/209.8, 209.18, 209.25
See application file for complete search history.

(56) References Cited

U.S. PATENT DOCUMENTS 6,003,574 A * 12/1999 Boiocchi ................. B60C 11/03
                                                      152/209.1
2003/0056867 A1    3/2003 Bettiol et al.
2009/0101260 A1 *  4/2009 Ikegami .............. B60C 11/0306
                                                      152/209.18

FOREIGN PATENT DOCUMENTS

CN    101384441 A    3/2009
CN    101835635 A    9/2010
(Continued)

OTHER PUBLICATIONS

International Search Report of PCT/JP2012/006245 dated Nov. 13, 2012.
(Continued)

*Primary Examiner* — Eric Hug
(74) *Attorney, Agent, or Firm* — Sughrue Mion, PLLC

(57) ABSTRACT

A pneumatic tire according to the present invention includes, one or more main grooves extending in the tire circumferential direction, and a plurality of lateral grooves extending in the tire width direction, the main grooves and the lateral grooves defining a block row formed by a plurality of blocks, at least one sipe being disposed in each block. Each block has a first cutaway groove with one end opening into a lateral groove located on one side of the block and the other end terminating within the block, a second cutaway groove with one end opening into a lateral groove located on the other side of the block and the other end terminating within the block, and a connecting narrow groove having a groove width narrower than that of the first and the second cutaway groove and connecting the first and the second cutaway groove.

22 Claims, 5 Drawing Sheets

(51) Int. Cl.
*B60C 11/117* (2006.01)
*B60C 11/13* (2006.01)

(52) U.S. Cl.
CPC .... *B60C11/1369* (2013.04); *B60C 2011/0339* (2013.04); *B60C 2011/0341* (2013.04); *B60C 2011/0369* (2013.04); *B60C 2011/0381* (2013.04); *B60C 2011/0388* (2013.04); *B60C 2011/1209* (2013.04); *B60C 2011/1213* (2013.04)

(56) References Cited

FOREIGN PATENT DOCUMENTS

| | | |
|---|---|---|
| EP | 1036674 B1 | 6/2005 |
| EP | 2127905 A2 | 12/2009 |
| JP | 5-178032 * | 7/1993 |
| JP | 05178032 A | 7/1993 |
| JP | 6-16016 * | 1/1994 |
| JP | 0616016 A | 1/1994 |
| JP | 06001119 A | 1/1994 |
| JP | 2000-264021 A | 9/2000 |
| JP | 2001-071713 A | 3/2001 |
| JP | 2001322408 A | 11/2001 |
| JP | 2004-98938 * | 4/2004 |
| JP | 2004-098938 A | 4/2004 |
| JP | 2005186850 A | 7/2005 |
| JP | 2006160055 A | 6/2006 |
| WO | 2008/026255 A1 | 3/2008 |

OTHER PUBLICATIONS

Communication dated Feb. 17, 2015, issued by the Japan Patent Office in corresponding application No. 2014-182621.
Communication dated Feb. 17, 2015, issued by the Japan Patent Office in corresponding application No. 2011-212889.
Communication dated May 26, 2015 from the European Patent Office in counterpart application No. 12836896.6.
Communication dated Sep. 1, 2015, issued by the Russian Patent Office in corresponding Russian Application No. 2014116906/11.
Communication dated Sep. 15, 2015 from the State Intellectual Property Office of the People's Republic of China in counterpart Application No. 201280046691.8.
Communication dated Sep. 29, 2015, issued by the Japan Patent Office in corresponding application No. 2014-182621.

* cited by examiner

PNEUMATIC TIRE

CROSS REFERENCE TO RELATED APPLICATIONS

This is a National Stage of International Application No. PCT/JP2012/006245 filed Sep. 28, 2012, claiming priority based on Japanese Patent Application No. 2011-212889 filed Sep. 28, 2011 and Japanese Patent Application No. 2011-262689 filed Nov. 30, 2011, the contents of all of which are incorporated herein by reference in their entirety.

TECHNICAL FIELD

The present invention relates to a pneumatic tire, particularly to a pneumatic tire with excellent on-snow performance.

BACKGROUND ART

In general, it is desired that pneumatic tires suitable for snowy roads, including roads with compacted snow, have excellent braking performance (on-snow braking performance), traction performance (on-snow traction performance), and turning performance (on-snow turning performance) on snowy roads.

Normally, the braking performance, traction performance, turning performance, and the like of a tire are affected by the friction characteristics of the tire. Therefore, in order to improve the on-snow braking performance, on-snow traction performance, and on-snow turning performance of a tire, it is necessary to improve the friction characteristics of the tire on snowy roads.

One known way of improving the friction characteristics of a tire on snowy roads is to enhance the shear resistance of the snow column formed in a groove provided in the tread (i.e. increase the snow column shear force) by improving the force with which the tire grabs and packs trodden snow when the tire is rotated with load applied thereon. Other known ways of improving the friction characteristics of a tire on snowy roads include guaranteeing the tire ground contact area, as well as enhancing the scratch effect on the road surface due to edges of blocks and edges of sipes formed in the tread.

In a conventional pneumatic tire, however, in which a plurality of main grooves extending along the tire circumferential direction and a plurality of lateral grooves extending along the tire width direction are formed on the tread surface to define rectangular blocks, with sipes formed in the blocks, it has not been possible to achieve an improvement in snow column shear force, a guarantee of tire ground contact area, and an improvement in the scratch effect on the road surface simultaneously.

In other words, in the above conventional pneumatic tire, upon increasing the groove depth of the lateral grooves in order to enhance the snow column shear force, the rigidity of the block in the tire circumferential direction decreases, and the angle of collapse of the block upon ground contact ends up increasing, thus making it impossible to guarantee the tire ground contact area. Furthermore, if the number of grooves or sipes formed in the tread surface is increased in order to enhance the scratch effect on the road surface due to edges of blocks and edges of sipes, the rigidity of the block decreases, and the angle of collapse of the block upon ground contact ends up increasing, thus making it impossible to guarantee the tire ground contact area.

On the other hand, in order to guarantee the tire ground contact area by suppressing the decrease in rigidity of the block, it is necessary to form rib-shaped land portions instead of blocks in the tread surface or to suppress the sipe density to be within a predetermined range (for example, see JP2001-71713A (PTL 1)), thus making it impossible to enhance the snow column shear force and the scratch effect on the road surface.

CITATION LIST

Patent Literature

PTL 1: JP2001-71713A

SUMMARY OF INVENTION

It is therefore an object of the present invention to provide a pneumatic tire that, by simultaneously achieving a guarantee of the tire ground contact area, an improvement in the scratch effect on the road surface due to edges, and an improvement in the snow column shear force all at a high level, enhances the friction characteristics of the tire on snowy roads and improves the on-snow performance such as on-snow braking performance, on-snow traction performance, on-snow turning performance, and the like.

A pneumatic tire according to the present invention for resolving the above problems advantageously is a pneumatic tire comprising, in at least a portion of a tread surface located between both tread ends: one or more main grooves extending in a tire circumferential direction; and a plurality of lateral grooves extending in a tire width direction between the main grooves and/or between the main groove and the tread end, the main grooves and the lateral grooves defining a block row formed by a plurality of blocks, at least one sipe being disposed in each block, each block having formed therein: a first cutaway groove with one end opening into a lateral groove located on one side of the block in the tire circumferential direction and the other end terminating within the block; a second cutaway groove with one end opening into a lateral groove located on the other side of the block in the tire circumferential direction and the other end terminating within the block; and a connecting narrow groove having a groove width narrower than that of the first cutaway groove and the second cutaway groove and connecting the first cutaway groove and the second cutaway groove. By forming the first cutaway groove and the second cutaway groove to have one end opening into a lateral groove and the other end terminating within the block, the snow treading and packing force can be improved in the lateral groove, in particular in the portion where the lateral groove intersects the first cutaway groove and the second cutaway groove, thereby enhancing the snow column shear force. Furthermore, by having the first cutaway groove and the second cutaway groove terminate within the block and by connecting the first cutaway groove and the second cutaway groove with the connecting narrow groove, a decrease in the rigidity of the block (flexural rigidity) causing a reduction in the tire ground contact area can be suppressed, while guaranteeing the edge component, in particular the edge component extending along the tire circumferential direction (referred to below as "tire circumferential direction edge component"). Therefore, according to this pneumatic tire, it is possible simultaneously to achieve a guarantee of the tire ground contact area, an improvement in the scratch effect on the road surface due to edges, and an improvement in the snow column shear force all at a high level, and to improve the on-snow performance such as on-snow braking performance, on-snow traction performance, on-snow turning performance, and the like.

Note that in the present disclosure, "extending in a tire circumferential direction" refers to extending towards the tire circumferential direction and includes the case of extending at an inclination with respect to a direction parallel to the tire circumferential direction. Furthermore, "extending in a tire width direction" refers to extending towards the tire width direction and includes the case of extending at an inclination with respect to a direction parallel to the tire width direction.

In the pneumatic tire according to the present invention, a rigidity of the block preferably increases from an opening side of the first cutaway groove towards a terminating side of the first cutaway groove and increases from an opening side of the second cutaway groove towards a terminating side of the second cutaway groove. The reason is that by causing the rigidity of the block, in particular the flexural rigidity, to increase from the opening side towards the terminating side of the first cutaway groove and the second cutaway groove, the snow grabbing force in the lateral grooves can be increased to further enhance the snow column shear force, and the scratch effect on the road surface due to edges can be increased, while suppressing a reduction in the tire ground contact area. According to this pneumatic tire, it is possible simultaneously to achieve a guarantee of the tire ground contact area, an improvement in the scratch effect on the road surface due to edges, and an improvement in the snow column shear force all at a sufficiently high level, and to improve the on-snow performance such as on-snow braking performance, on-snow traction performance, on-snow turning performance, and the like.

In the pneumatic tire according to the present invention, a groove depth of the first cutaway groove and the second cutaway groove preferably decreases from the opening side towards the terminating side. The reason is that by causing the groove depth of the first cutaway groove and the second cutaway groove to decrease from the opening side towards the terminating side, the rigidity of the block can be caused to increase from the opening side towards the terminating side of each cutaway groove with a simple structure.

In the pneumatic tire according to the present invention, each block preferably includes a width direction sipe extending in the tire width direction and intersecting the connecting narrow groove. The reason is that by forming a width direction sipe in each block, the edge component extending along the tire width direction (referred to below as the "tire width direction edge component") can be guaranteed, thus improving the on-snow braking performance and on-snow traction performance, while also guaranteeing drainage performance. Another reason is that having the width direction sipe intersect the connecting narrow groove can suppress a great decrease in rigidity of the block and a reduction in the tire ground contact area as compared to when the width direction sipe intersects the first cutaway groove or the second cutaway groove.

In the pneumatic tire according to the present invention, the first cutaway groove and the second cutaway groove preferably extend at an inclination in a same direction with respect to the tire circumferential direction, and the connecting narrow groove preferably extends at an inclination in an opposite direction with respect to the tire circumferential direction than the first cutaway groove and the second cutaway groove. The reason is that having the inclination direction of the first cutaway groove and the second cutaway groove differ from the inclination direction of the connecting narrow groove to arrange the first cutaway groove, the connecting narrow groove, and the second cutaway groove in a zigzag pattern can guarantee the tire width direction edge component and improve the on-snow braking performance and on-snow traction performance.

Note that in the present disclosure, an "extending direction of a groove" refers to the direction in which a groove width centerline extends when a groove such as the first cutaway groove, the second cutaway groove, the connecting narrow groove, or the like extends linearly and refers to the direction in which an amplitude centerline of the groove extends when the groove extends with a bend.

The pneumatic tire according to the present invention preferably further comprises a land portion row, on the tread surface, adjacent to the block row with the main groove therebetween, and in a portion of the land portion row located along an extension line of the lateral grooves, an extension lateral groove is preferably formed with one end opening into the main groove and the other end terminating within the land portion row. The reason is that by forming the extension lateral groove, the snow treading and packing force can be improved in a portion where the lateral groove and the main groove intersect and the snow column shear force can be enhanced, thereby improving the on-snow braking performance and the on-snow traction performance. Another reason is that by causing the extension lateral groove to terminate within the land portion row, a decrease in the rigidity of the land portion row can be suppressed, and a decrease in the steering stability can be suppressed.

Note that in the present disclosure, the "land portion row" may be a block land portion row composed of a plurality of individual blocks or may be a rib-shaped land portion row that extends continuously in the tire circumferential direction. Furthermore, in the present disclosure, the "extension line of the lateral grooves" refers to the groove width centerline of the lateral grooves when the lateral grooves extend linearly and refers to the amplitude centerline of the lateral grooves when the lateral grooves extend with a bend.

In the pneumatic tire according to the present invention, the first cutaway groove preferably extends in a direction orthogonal to the lateral groove located on one side of the block in the tire circumferential direction, and the second cutaway groove preferably extends in a direction orthogonal to the lateral groove located on the other side of the block in the tire circumferential direction. The reason is that by causing the first cutaway groove and the second cutaway groove to be orthogonal to the lateral grooves can further enhance the snow column shear force at the portion where the lateral grooves intersect the first cutaway groove or the second way cutaway groove and can further increase the on-snow braking performance and the on-snow traction performance.

In the pneumatic tire according to the present invention, a shape of the tread surface from a tire equator to a tread end located on one side in the tire width direction preferably differs from a shape of the tread surface from the tire equator to a tread end located on the other side in the tire width direction, and each block is preferably formed on the one side in the tire width direction of the tire equator. The reason is that by causing the pattern of the tread surface to be asymmetric on either side of the tire equator and forming the above blocks, which can improve the on-snow performance, on one side in the tire width direction, a pattern that can improve other areas of performance (such as on-ice performance) can be formed on the other side in the tire width direction, so that a balance can be achieved between on-snow performance and other areas of performance.

According to the pneumatic tire of the present invention, it is possible simultaneously to achieve a guarantee of the tire ground contact area, an improvement in the scratch effect on the road surface due to edges, and an improvement in the snow column shear force all at a high level, and to improve the on-snow performance of the tire by enhancing the friction characteristics of the tire on snowy roads.

BRIEF DESCRIPTION OF DRAWINGS

The present invention will be further described below with reference to the accompanying drawings, wherein.

DESCRIPTION OF EMBODIMENTS

The following describes embodiments of the present invention with reference to the drawings. Note that in the figures, identical constituent elements are labeled with the same reference signs.

Figure 1:
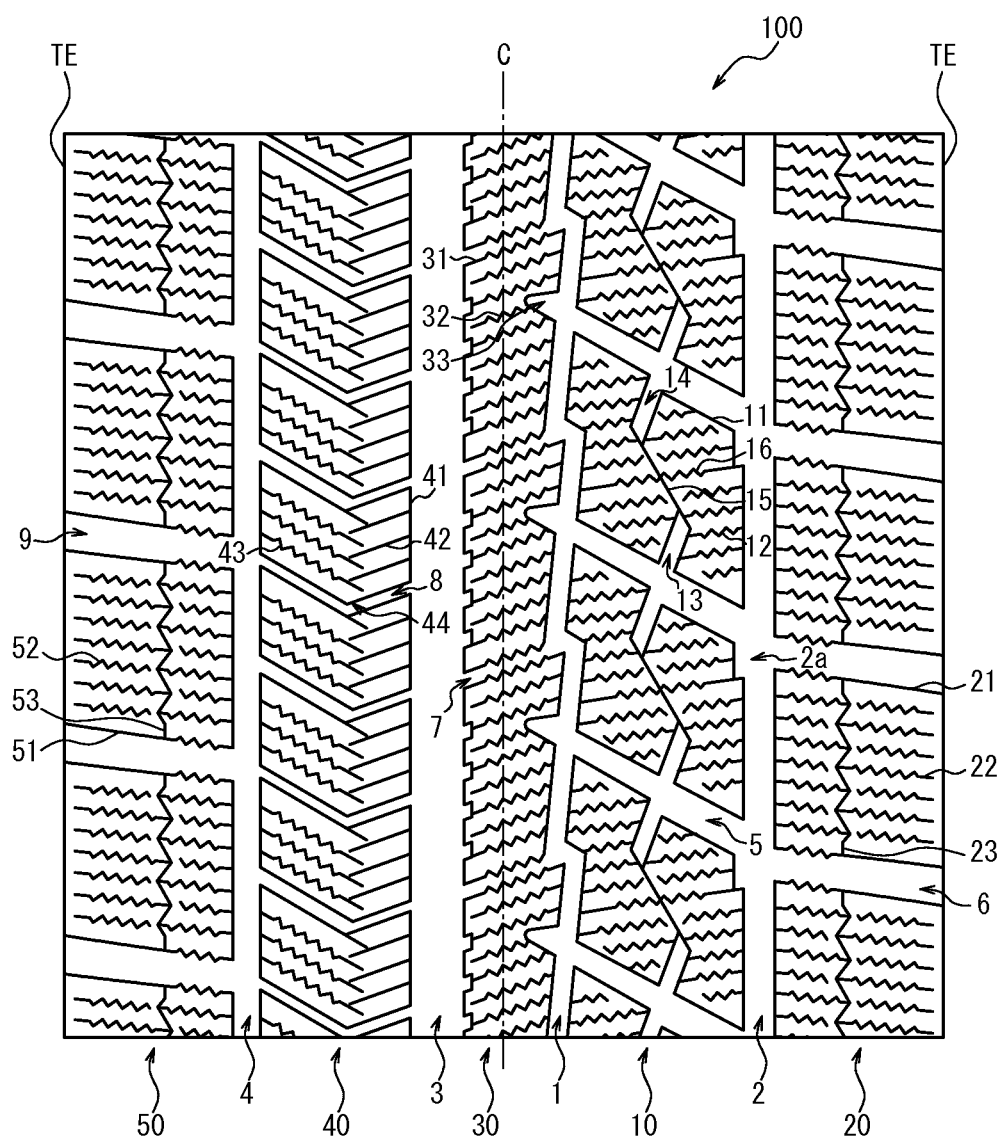
FIG. 1 is a development view of a portion of the tread of a representative pneumatic tire according to the present invention.

FIG. 1 is a development view of a portion of the tread in an example of a pneumatic tire according to the present invention. The pneumatic tire shown in FIG. 1 is not particularly limited and can be suitably used as a studless tire.

As shown in FIG. 1, in this example of a pneumatic tire, a tread surface 100 located between both tread ends TE has a left-right asymmetric shape centering on a tire equator C. In other words, in this example of a pneumatic tire, the pattern from the tire equator C to a tread end TE located on one side in the tire width direction (the right side in FIG. 1) differs from the pattern from the tire equator C to a tread end TE located on the other side in the tire width direction (the left side in FIG. 1).

Specifically, on the tread surface 100 between the tire equator C and the tread end TE located on one side in the tire width direction (the right side in FIG. 1), a single first main groove 1 extending in the tire circumferential direction, a single second main groove 2 extending in the tire circumferential direction and located closer to the tread end TE than the first main groove 1, a plurality of lateral grooves 5 extending in the tire width direction between the first main groove 1 and the second main groove 2, and a plurality of lug grooves 6 extending in the tire width direction between the second main groove 2 and the tread end TE are formed.

The first main groove 1 extends in the tire circumferential direction while bending in a zigzag pattern. The second main groove 2 extends along the tire circumferential direction and has enlarged portions 2a, in which the groove width is enlarged, at predetermined intervals in the tire circumferential direction. Furthermore, the lateral grooves 5 extend at an inclination of a predetermined angle with respect to the tire width direction (to the upper left in FIG. 1), and the lug grooves 6 also extend at an inclination of a predetermined angle with respect to the tire width direction (to the upper left in FIG. 1). Incidentally, the groove width of the lateral grooves 5 gradually decreases from the second main groove 2 side to the first main groove 1 side.

On the tread surface 100 between the tire equator C and the tread end TE located on one side in the tire width direction (the right side in FIG. 1), a block row 10 is formed by a plurality of blocks 11 defined by the first main groove 1, the second main groove 2, and the lateral grooves 5. On the tread end TE side of the block row 10, a shoulder block row 20 is formed by a plurality of shoulder blocks 21 defined by the second main groove 2, the lug grooves 6, and the tread end TE.

In plan view of the tread surface 100, the blocks 11 and the shoulder blocks 21 have a general parallelogram shape.

On the tread surface 100 between the tire equator C and the tread end TE located on the other side in the tire width direction (the left side in FIG. 1), a single circumferential thick groove 3 extending in the tire circumferential direction, a single circumferential narrow groove 4 extending in the tire circumferential direction and located closer to the tread end TE than the circumferential thick groove 3, a plurality of bent lateral grooves 8 extending in the tire width direction between the circumferential thick groove 3 and the circumferential narrow groove 4, and a plurality of lug grooves 9 extending in the tire width direction between the circumferential narrow groove 4 and the tread end TE are formed.

The circumferential thick groove 3 extends along the tire circumferential direction. The circumferential narrow groove 4 has a narrower groove width than the circumferential thick groove 3 and extends linearly along the tire circumferential direction. Furthermore, the bent lateral grooves 8 extend in the tire width direction and have one bent point forming a shape convex in one side in the tire circumferential direction (downwards in FIG. 1). The lug grooves 9 extend at an inclination of a predetermined angle with respect to the tire width direction (to the upper left in FIG. 1).

On the tread surface 100 between the tire equator C and the tread end TE located on the other side in the tire width direction (the left side in FIG. 1), an arrow feather block row 40 is formed by a plurality of arrow feather blocks 41 defined by the circumferential thick groove 3, the circumferential narrow groove 4, and the bent lateral grooves 8. On the tread end TE side of the arrow feather block row 40, a shoulder block row 50 is formed by a plurality of shoulder blocks 51 defined by the circumferential narrow groove 4, the lug grooves 9, and the tread end TE.

In plan view of the tread surface 100, the arrow feather blocks 41 have an arrow feather shape in which the position of the apex is offset to one side in the tire width direction (the right side in FIG. 1). The shoulder blocks 51 have a general parallelogram shape.

Furthermore, in a central portion of the tread surface 100 (near the tire equator C), central lateral grooves 7 are formed extending in the tire width direction between the first main groove 1 and the circumferential thick groove 3.

The central lateral grooves 7 bend in a zigzag pattern, and extend at an inclination of a predetermined angle with respect to the tire width direction (to the upper right in FIG. 1).

In the central portion of the tread surface 100 (near the tire equator C), a central block row (land portion row) 30 is formed by a plurality of central blocks 31 defined by the first main groove 1, the circumferential thick groove 3, and the central lateral grooves 7.

In plan view of the tread surface 100, the central blocks 31 have a generally trapezoidal shape.

In the blocks 11 forming the block row 10 located between the first main groove 1 and the second main groove 2, one or more sipes 12 extending in the tire width direction, a first cutaway groove 13 with one end opening into the lateral groove 5 located on one side of the block 11 in the tire circumferential direction (the lower side in FIG. 1) and the other end terminating within the block 11, a second cutaway groove 14 with one end opening into the lateral groove 5 located on the other side of the block 11 in the tire circumferential direction (the upper side in FIG. 1) and the other end terminating within the block 11, and a connecting narrow groove 15 that connects the first cutaway groove 13 and the second cutaway groove 14 are formed. In each of the blocks 11, a width direction sipe 16 extending in the tire width direction and intersecting the connecting narrow groove 15 is formed.

The sipes 12 are not particularly limited and form a zigzag pattern in plan view, also bending in the depth direction. The opening width of the sipes 12 is, for example, from 0.3 mm to 1.0 mm. The sipes 12 extend in a direction intersecting the extending direction of the lateral grooves 5 with the tire circumference line therebetween. In other words, the direction of inclination of the sipes 12 with respect to the tire circumferential direction (or the tire width direction) is in the opposite direction from the direction of inclination of the lateral grooves 5 with respect to the tire circumferential direction (or the tire width direction).

The first cutaway groove 13 and the second cutaway groove 14 are linear in plan view and extend at an inclination, towards the right in FIG. 1, with respect to the tire circumferential direction. In other words, the first cutaway groove 13 and the second cutaway groove 14 extend towards the upper right in FIG. 1.

The first cutaway groove 13 and the second cutaway groove 14 are orthogonal to the lateral grooves 5. Between adjacent blocks 11 in the tire circumferential direction, the groove width centerline of the first cutaway groove 13 and the groove width centerline of the second cutaway groove 14 are located along the same line. In other words, the lateral groove 5, the second cutaway groove 14 in the block 11 located on one side of the lateral groove 5 in the tire circumferential direction (the lower side in FIG. 1), and the first cutaway groove 13 in the block 11 located on the other side of the lateral groove 5 in the tire circumferential direction (the upper side in FIG. 1) intersect so as to form a general cross-like shape. Note that in the pneumatic tire of the present invention, the first cutaway groove and the second cutaway groove may intersect the lateral groove at an angle other than 90°.

The connecting narrow groove 15 has a groove width narrower than that of the first cutaway groove 13 and the second cutaway groove 14 and extends at an inclination, towards the left in FIG. 1, with respect to the tire circumferential direction. In other words, the connecting narrow groove 15 extends at an inclination towards the opposite side from the first cutaway groove 13 and the second cutaway groove 14, towards the upper left in FIG. 1. Therefore, in the block 11, the first cutaway groove 13, connecting narrow groove 15, and second cutaway groove 14 are disposed to form a zigzag pattern.

The width direction sipe 16 is not particularly limited and forms a zigzag pattern in plan view, also bending in the depth direction. The width direction sipe 16 intersects the connecting narrow groove 15 and extends at an inclination with respect to the tire width direction (to the upper right in FIG. 1).

In each of the central blocks 31 forming the central block row 30 located between the first main groove 1 and the circumferential thick groove 3 of the tread surface 100, a plurality of sipes 32 extending in the tire width direction and an extension lateral groove 33 with one end opening into the first main groove 1 and the other end terminating within the central block 31 are formed.

The sipes 32 are not particularly limited and form a zigzag pattern in plan view, also bending in the depth direction.

The extension lateral groove 33 is located along an extension line (groove width centerline) of the lateral grooves 5 defining the blocks 11 of the block row 10 adjacent to the central block row 30, with the first main groove 1 therebetween. In other words, the extension lateral groove 33 is located where the lateral groove 5 extends to the side of the central block row 30.

The first main groove 1, the lateral groove 5, and the extension lateral groove 33 intersect so as to form a general X-shape.

Furthermore, in the arrow feather blocks 41 forming the feather block row 40 located between the circumferential thick groove 3 and the circumferential narrow groove 4 on the tread surface 100, three composite sipes are formed each by a first sipe 42 that is linear in plan view and a second sipe 43 that forms a zigzag pattern in plan view.

One end of the first sipe 42 opens into the circumferential thick groove 3, located on the tire circumferential protrusion 44 side of the arrow feather block 41 with respect to the width centerline of the arrow feather block 41, and the other end terminates within the arrow feather block 41. One end of the second sipe 43 opens into the circumferential narrow groove 4, located on the side opposite from the tire circumferential protrusion 44 side of the arrow feather block 41 with respect to the width centerline of the arrow feather block 41, and the other end terminates within the arrow feather block 41.

Each composite sipe formed by the first sipe 42 and the second sipe 43 extends across the entire area of the arrow feather block 41 in the tire width direction in a pattern corresponding to the bent lateral grooves 8, and a portion of the first sipe 42 overlaps with a portion of the second sipe 43 in the tire circumferential direction. In other words, when the composite sipe formed by the first sipe 42 and the second sipe 43 is projected onto a plane that is orthogonal to the block surface and includes the tire axis of rotation, the dimension in the tire width direction of the projection drawing is equivalent to the dimension in the tire width direction of the arrow feather block 41. In the projection drawing, the dimension component in the tire width direction of the first sipe 42 overlaps the dimension component in the tire width direction of the second sipe 43.

On the tread surface 100, in the shoulder blocks 21 forming the shoulder block row 20 located between the second main groove 2 and the tread end TE and in the shoulder blocks 51 forming the shoulder block row 50 located between the circumferential narrow groove 4 and the tread end TE, lateral sipes 22 and 52 that extend in the tire width direction and form a zigzag pattern in plan view and longitudinal sipes 23 and 53 that extend in the tire circumferential direction and form a zigzag pattern in plan view are respectively formed.

According to this example of a pneumatic tire, since the block row 10 formed by the plurality of blocks 11 is formed on the tread surface 100 between the tire equator C and the tread end TE located on one side in the tire width direction (the right side in FIG. 1), the on-snow performance such as on-snow braking performance, on-snow traction performance, on-snow turning performance, and the like can be improved.

In other words, in the block 11, since the first cutaway groove 13 and the second cutaway groove 14 with one end opening into the lateral groove 5 and the other end terminating within the block 11 are formed, the trodden and packed snow is not allowed to escape in the tire circumferential direction, and a snow column can be formed also in the first cutaway groove and the second cutaway groove. Furthermore, the snow column formed in the first cutaway groove 13 and in the second cutaway groove 14 can be knocked against the snow column formed in the lateral groove 5, thus packing the snow columns within the grooves. Accordingly, in the region where the block row 10 is formed, within the lateral grooves 5 located on either side of the block 11 in the tire circumferential direction, in particular in a portion where the lateral grooves 5 intersect with the first cutaway groove 13 or the second cutaway groove 14, it is possible to improve the snow treading and packing force so as to enhance the snow column shear force.

Since the first cutaway groove 13 and the second cutaway groove 14 terminate within the block 11, a decrease in the rigidity of the block 11 and a reduction in the tire ground contact area can be suppressed as compared to when a cutaway groove with a fixed groove width is formed in the tire circumferential direction across the entire block 11.

Furthermore, since the first cutaway groove 13 and the second cutaway groove 14 are connected by the connecting narrow groove 15, it is possible to guarantee an edge component, in particular the tire circumferential direction edge component, and to enhance the scratch effect on the road surface in the tire width direction due to the edges while suppressing a decrease in the rigidity of the block 11. The plurality of sipes 12 extending in a zigzag pattern are formed, and therefore both the tire circumferential direction edge component and the tire width direction edge component can be sufficiently guaranteed, thus achieving the scratch effect on the road surface due to the edges. The extending direction of the sipes 12 and the extending direction of the lateral grooves 5 preferably intersect, with the tire circumference line therebetween. The reason is that the on-snow performance can be further improved.

Since the sipes 12 extending in a zigzag pattern are formed in the block 11, the area of the sipes can be guaranteed, the drainage performance enhanced, and the on-ice performance and wet performance improved. Small blocks having the sipes 12 therebetween can also support each other in the tire circumferential direction at the time of input to the block 11, thereby guaranteeing rigidity of the entire block 11 and enhancing steering stability.

Therefore, according to this example of a pneumatic tire, in the portion forming the block row 10, it is possible simultaneously to achieve a guarantee of the tire ground contact area, an improvement in the scratch effect on the road surface due to edges, and an improvement in the snow column shear force all at a high level, and to improve the on-snow performance such as on-snow braking performance, on-snow traction performance, on-snow turning performance, and the like by enhancing the friction characteristics of the tire on snowy roads.

In this example of a pneumatic tire, since the width direction sipe 16 is formed in each block 11, the tire width direction edge component can be guaranteed, and the on-snow braking performance and on-snow traction performance can be improved. The drainage performance can also be enhanced, and the wet performance can be guaranteed. Furthermore, in this example of a pneumatic tire, since the width direction sipe 16 and the connecting narrow groove 15 intersect, a guarantee of edge components and an improvement in drainage performance can be achieved while suppressing a great decrease in rigidity of the block 11, causing a reduction in the tire ground contact area as compared to when the width direction sipe 16 intersects the first cutaway groove 13 or the second cutaway groove 14.

In this example of a pneumatic tire, in each of the central blocks 31 of the central block row 30 adjacent to the block row 10 in the tire width direction, with the first main groove 1 therebetween, the extension lateral groove 33 with one end opening into the first main groove 1 and the other end terminating within the central block 31 is formed, and therefore the snow trodden and packed in the lateral grooves 5 is not allowed to escape in the tire width direction, and a snow column can be formed also in the extension lateral groove 33. Accordingly, in the portion where the lateral grooves 5 and the first main groove 1 intersect, the snow treading and packing force can be improved and the snow column shear force can be enhanced. In this example of a pneumatic tire, since the extension lateral groove 33 terminates within the central block 31, a decrease in the rigidity of the central blocks 31 can be suppressed, thereby suppressing a decrease in the steering stability.

Furthermore, in this example of a pneumatic tire, since the first cutaway groove 13, the connecting narrow groove 15, and the second cutaway groove 14 are disposed in each block 11 so as to form a zigzag pattern, the tire width direction edge component can be guaranteed, and the on-snow braking performance and on-snow traction performance can be improved.

In this example of a pneumatic tire, the groove width of the lateral grooves 5 gradually decreases from the second main groove 2 side to the first main groove 1 side, and hence the on-snow traction performance can be effectively enhanced while suppressing a decrease in the rigidity of the blocks 11.

From the perspective of sufficiently suppressing a decrease in the rigidity of the blocks 11 and sufficiently guaranteeing the tire ground contact area, the groove width (opening width) of the first cutaway groove 13 and the second cutaway groove 14 is preferably 6 mm or less, for example, and the length of the first cutaway groove 13 and the second cutaway groove 14 in the extending direction is preferably 25 mm or less, for example. Furthermore, the length of the first cutaway groove 13 and the second cutaway groove 14 in the tire circumferential direction is preferably ⅓ or less of the length of the block 11 in the tire circumferential direction. On the other hand, from the perspective of treading and packing a sufficient amount of snow in the first cutaway groove 13 and the second cutaway groove 14 to increase the snow column shear force, the groove width (opening width) of the first cutaway groove 13 and the second cutaway groove 14 is preferably 1.2 mm or more, for example, and the length of the first cutaway groove 13 and the second cutaway groove 14 in the extending direction is preferably 5 mm or more, for example.

From the perspective of enhancing the snow treading and packing force in the lateral grooves 5 and improving the snow column shear force, the angle formed between the tire width direction line and the lateral grooves 5 (i.e. the inclination angle of the lateral grooves 5 with respect to the tire width direction) is preferably 0° or more and 45° or less.

Furthermore, from the perspective of enhancing the snow treading and packing force and improving the snow column shear force at the portion where the lateral grooves 5 intersect the first cutaway groove 13 or the second cutaway groove 14, the angle between the extending direction of the first cutaway groove 13 or the second cutaway groove 14 and the extending direction of the lateral grooves 5 is preferably 45° or more as measured at the acute angle side, and the extending direction of the first cutaway groove 13 and the second cutaway groove 14 is preferably orthogonal to the extending direction of the lateral grooves 5.

From the perspective of sufficiently suppressing a decrease in the rigidity of the blocks 11 and sufficiently guaranteeing the tire ground contact area, the groove width (opening width) of the connecting narrow groove 15 is preferably 1.2 mm or less, for example. Note that from the perspective of tire production, the groove width of the connecting narrow groove 15 is preferably 0.3 mm or more.

In this example of a pneumatic tire, on the tread surface 100 between the tire equator C and the tread end TE located on the other side in the tire width direction (the left side in FIG. 1), the arrow feather block row 40 is formed by the plurality of arrow feather blocks 41, thereby also improving the on-ice performance such as on-ice braking performance, on-ice traction performance, on-ice turning performance, and the like. Accordingly, in this example of a pneumatic tire, while improving the on-snow performance at one side of the tread surface 100 (the right side in FIG. 1), the on-ice performance can be improved at the other side of the tread surface 100 (the left side in FIG. 1), so that a balance can be achieved between on-snow performance and on-ice performance.

In the region where the arrow feather block row 40 is formed, the on-ice performance is improved as follows.

Figure 2:
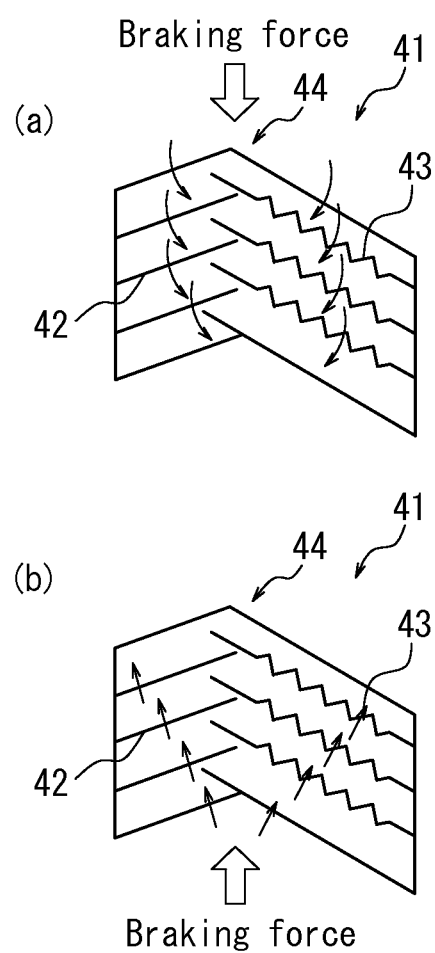
FIG. 2 illustrates the force acting on a block in the pneumatic tire shown in FIG. 1 when a braking force is applied, with (a) illustrating the case of the tire circumferential protrusion being located on the leading edge side of the block and (b) illustrating the case of the tire circumferential protrusion being located on the trailing edge side of the block.

Specifically, when the tire circumferential protrusion 44 side of the arrow feather block 41 becomes the leading edge side during tire braking, then as shown by the enlarged view of the arrow feather block 41 in FIG. 2(*a*), a force acts in a direction (indicated by the arrow in FIG. 2(*a*)) to cause the feather portion corresponding to both width ends of the arrow-feather shaped arrow feather block 41 to collapse towards the center portion (where the apex of the tire circumferential protrusion 44 is located). Accordingly, the arrow feather block 41 becomes less susceptible to collapsing deformation, particularly at the portion where the tire circumferential protrusion 44 is located, thereby guaranteeing the tire ground contact area. The feather portion of the arrow feather block 41 (at both ends in the tire width direction) undergoes some collapsing deformation, and hence the scratch effect on the road surface (icy road surface) due to the edges of the arrow feather block 41 can be improved. Furthermore, in the arrow feather block 41, the composite sipe formed by the first sipe 42 and the second sipe 43 is disposed so as to extend across the entire area of the arrow feather block 41 in the tire width direction. Therefore, the edge component can be sufficiently guaranteed, and the scratch effect on the road surface due to the edges of the composite sipe can be improved.

When the opposite side from the tire circumferential protrusion 44 side of the arrow feather block 41 becomes the leading edge side during tire braking, then as shown by the enlarged view of the arrow feather block 41 in FIG. 2(*b*), a force acts in a direction (indicated by the arrow in FIG. 2(*b*)) to cause the arrow-feather shaped arrow feather block 41 to open. Accordingly, the feather portion of the arrow feather block 41 (at both ends in the tire width direction) undergoes some collapsing deformation, and the scratch effect on the road surface (icy road surface) due to the edges of the arrow feather block 41 can be improved. Furthermore, in the arrow feather block 41, the composite sipes formed by the first sipes 42 and the second sipes 43 are disposed so as to extend across the entire area of the arrow feather block 41 in the tire width direction. Therefore, the edge component can be sufficiently guaranteed, and the scratch effect on the road surface due to the edge of the composite sipe can be improved.

From the perspective of sufficiently removing a water film formed between an icy road and the tire, thereby bringing the tire in close contact with the icy road surface to sufficiently guarantee the grip of the tire, the composite sipe located between the composite sipes at either end of the arrow feather block 41 in the tire circumferential direction is preferably a bottom-enlarged sipe (i.e. a flask sipe) having an enlarged portion at the bottom.

Furthermore, from the perspective of enhancing the scratch effect on the road surface due to the edges of the arrow feather blocks 41, the sidewalls of the arrow feather block 41 at the tire circumferential protrusion 44 side are preferably such that the angle at which each of the two sidewall portions that are disposed in different directions approaches the apex of the tire circumferential protrusion 44 is within a range of 15° to 45° with respect to the tire width direction.

Furthermore, from the perspective of enhancing the scratch effect on the road surface due to the edges of the arrow feather block 41, the distance by which the apex of the tire circumferential protrusion 44 of the arrow feather block 41 is offset from the width centerline of the arrow feather block 41 is preferably from 10% to 30% of the block width of the arrow feather block 41.

Figure 3:
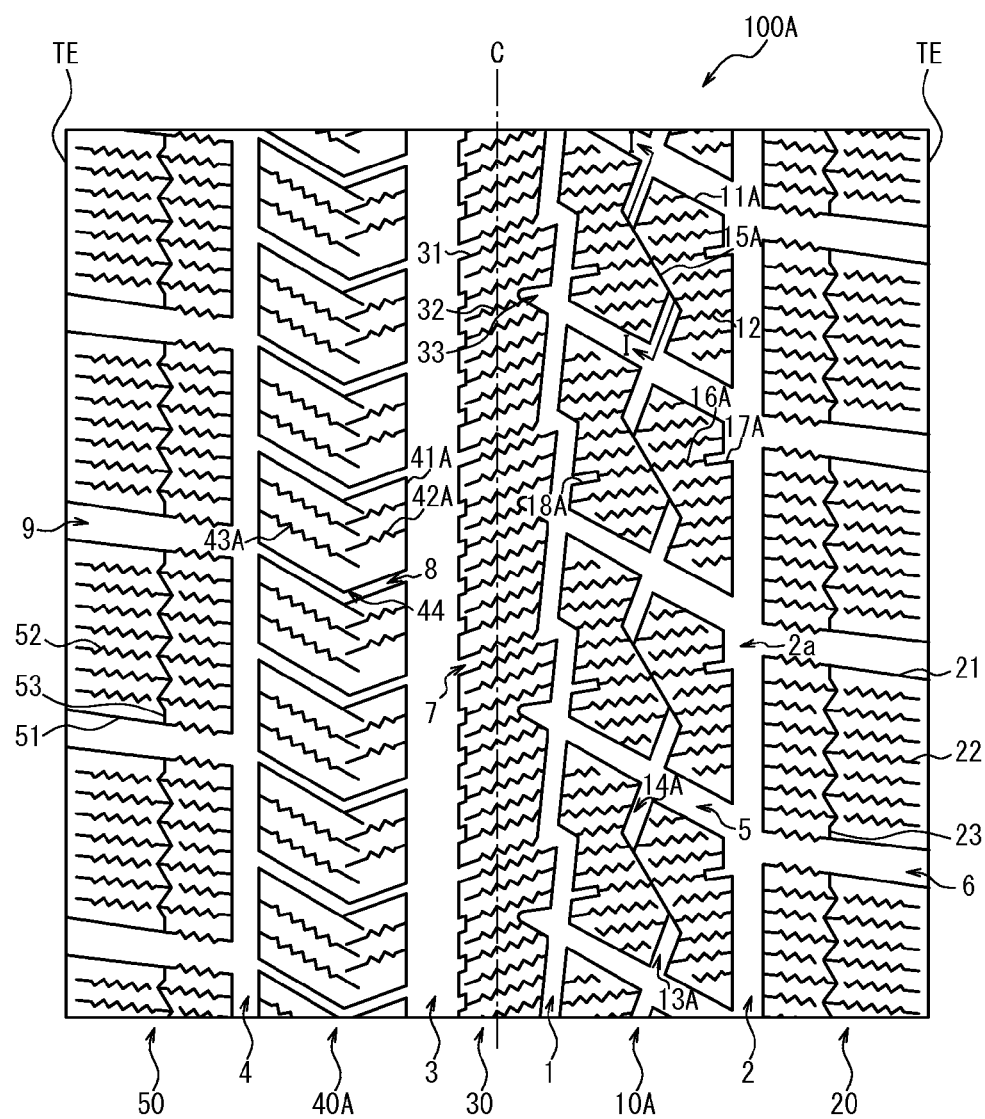
FIG. 3 is a development view of a portion of the tread of another pneumatic tire according to the present invention.

Next, FIG. 3 is a development view of a portion of the tread in another example of a pneumatic tire according to the present invention. Like the above example of a pneumatic tire, the pneumatic tire shown in FIG. 3 is not particularly limited and can be suitably used as a studless tire. The pneumatic tire shown in FIG. 3 has further improved friction characteristics on snowy roads and further enhanced on-snow performance.

This other example of a pneumatic tire is structured similarly to the above example of a pneumatic tire, differing in that the structure of blocks 11A defined by the first main groove 1, the second main groove 2, and the lateral grooves 5 differs from the structure of the blocks 11 in the above example of a pneumatic tire, and in that the structure of arrow feather blocks 41A defined by the circumferential thick groove 3, the circumferential narrow groove 4, and the bent lateral grooves 8 differs from the structure of the arrow feather blocks 41 in the above example of a pneumatic tire.

Specifically, the blocks 11A in this other example of a pneumatic tire differ from the structure of the blocks 11 in the above example of a pneumatic tire in the following points.

Namely, in each block 11A, a third cutaway groove 17A with one end opening into the second main groove 2 located on one side of the block 11A in the tire width direction (the right side in FIG. 3) and the other end terminating within the block 11A and a fourth cutaway groove 18A with one end opening into the first main groove 1 located on the other side of the block 11A in the tire width direction (the left side in FIG. 3) and the other end terminating within the block 11A are formed. In each block 11A, a width direction sipe 16A extending in the tire width direction intersects a connecting narrow groove 15A between the third cutaway groove 17A and the fourth cutaway groove 18A.

In each block 11A, the rigidity of the block (in particular the flexural rigidity) increases from the opening side of the first cutaway groove 13A towards the terminating side of the first cutaway groove 13A. Also, in each block 11A, the rigidity of the block (in particular the flexural rigidity) increases from the opening side of the second cutaway groove 14A towards the terminating side of the second cutaway groove 14A. In other words, in the blocks 11A, the rigidity of the block increases from the side by the lateral grooves 5 located on either side of the block 11A in the tire circumferential direction towards the tire circumferential position of the terminating end of the first cutaway groove 13A and the terminating end of the second cutaway groove 14A.

Specifically, in the blocks 11A, as described below in detail, by varying the groove depth of the first cutaway groove 13A and the groove depth of the second cutaway groove 14A within the grooves, the rigidity of the block is increased from the lateral grooves 5 side towards the terminating side of the first cutaway groove 13A and the terminating side of the second cutaway groove 14A.

In this other example of a pneumatic tire, the rigidity of the block is varied by varying the groove depth of the first cutaway groove and the groove depth of the second cutaway groove, yet in a pneumatic tire according to the present invention, the rigidity of the block may be varied in other ways, such as by changing the rubber composition used in the block or varying the density of the sipes formed in the block. From the perspective of varying the rigidity of the block using a simple structure, however, the rigidity of the block is preferably varied by varying the groove depth of the first cutaway groove and the second cutaway groove.

Figure 4:
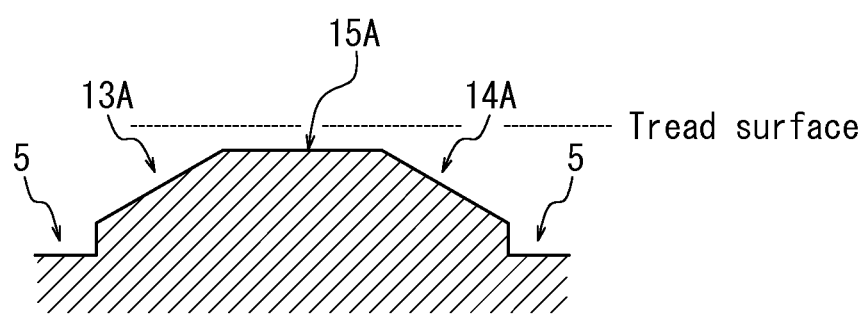
FIG. 4 is a cross-sectional diagram along the line I-I in FIG. 3.

As shown by FIG. 4, a cross-section along the line I-I in FIG. 3, the groove depth of the first cutaway groove 13A and the second cutaway groove 14A decreases from the opening side at the lateral groove 5 to the terminating side. In greater detail, at the position where the first cutaway groove 13A and the second cutaway groove 14A open to the lateral groove 5, the groove depth is shallower than the groove depth of the lateral groove 5. The groove depth then gradually decreases from the position where the first cutaway groove 13A and the second cutaway groove 14A open to the lateral groove 5 to the position of the terminating end in the block 11A.

Accordingly, the rigidity of the block 11A (in particular the flexural rigidity) gradually increases from the opening side of the first cutaway groove 13A to the terminating side of the first cutaway groove 13A and gradually increases from the opening side of the second cutaway groove 14A to the terminating side of the second cutaway groove 14A.

As shown in FIG. 4, the connecting narrow groove 15A has a groove depth approximately equivalent to that of the terminating side of the first cutaway groove 13A and the second cutaway groove 14A.

One end in the tire width direction of the width direction sipe 16A terminates at a location near the third cutaway groove 17A, and the other end thereof in the tire width direction terminates at a location near the fourth cutaway groove 18A. One end in the tire width direction of the width direction sipe 16A may open into the third cutaway groove 17A, and the other end thereof in the tire width direction may open into the fourth cutaway groove 18A. The opening width of the width direction sipe 16A is, for example, from 0.3 mm to 1.0 mm. The depth of the width direction sipe 16A is, for example, from 3.0 mm to 8.0 mm.

The third cutaway groove 17A and the fourth cutaway groove 18A are not particularly limited, are linear in plan view, and extend at an inclination (to the upper right in FIG. 3) with respect to the tire width direction. The third cutaway groove 17A, the fourth cutaway groove 18A, and the width direction sipe 16A are located along the same line.

The groove width of the third cutaway groove 17A and the fourth cutaway groove 18A is narrower than the groove width of the first cutaway groove 13A and the second cutaway groove 14A and wider than the opening width of the width direction sipe 16A. The groove depth of the third cutaway groove 17A and the fourth cutaway groove 18A is shallower than the groove depth of the first main groove 1 and the groove depth of the second main groove 2.

The arrow feather blocks 41A in this other example of a pneumatic tire differ from the structure of the arrow feather blocks 41 in the above example of a pneumatic tire in the following points.

Specifically, in the arrow feather blocks 41A, two composite sipes are formed each by a first sipe 42A and a second sipe 43A that form a zigzag pattern in plan view.

According to this other example of a pneumatic tire, like the above example of a pneumatic tire, the on-snow performance such as on-snow braking performance, on-snow traction performance, on-snow turning performance, and the like can be improved. Furthermore, in this other example of a pneumatic tire, like the above example of a pneumatic tire, while improving the on-snow performance at one side of the tread surface 100A (the right side in FIG. 3), the on-ice performance can be improved at the other side of the tread surface 100A (the left side in FIG. 3). Therefore, according to this other example of a pneumatic tire, a balanced improvement can be achieved in on-snow performance and on-ice performance.

In this other example of a pneumatic tire, the rigidity of the block 11A (in particular the flexural rigidity) gradually increases from the opening side (by the lateral groove 5) to the terminating side of the first cutaway groove 13A and gradually increases from the opening side (by the lateral groove 5) to the terminating side of the second cutaway groove 14A. Accordingly, in the region where the block row 10A is formed, when running on snowy roads, snow can be sufficiently grabbed at the side of the lateral groove 5, where the block rigidity is relatively low, thereby enhancing the snow column shear force. In the block 11A, the scratch effect on the road surface due to edges can be improved at the opening side of the first cutaway groove 13A and the second cutaway groove 14A, and block rigidity can be guaranteed and a reduction in the tire ground contact area can be suppressed at the terminating side of the first cutaway groove 13A and the second cutaway groove 14A (i.e. the center side of the block 11A in the tire circumferential direction).

Therefore, in this other example of a pneumatic tire, in the portion where the block row 10A is formed, it is possible simultaneously to achieve a guarantee of the tire ground contact area, an improvement in the scratch effect on the road surface due to edges, and an improvement in the snow column shear force all at a sufficiently high level, and to improve the on-snow performance such as on-snow braking performance, on-snow traction performance, on-snow turning performance, and the like by sufficiently enhancing the friction characteristics of the tire on snowy roads.

Note that in this other example of a pneumatic tire, in the portion where the block row 10A is formed, both a guarantee of the tire ground contact area and an improvement in the scratch effect on the road surface due to edges can be achieved, and hence areas of performance other than the on-snow performance can also be guaranteed, such as dry performance, wet performance, on-ice performance, wear resistance, and the like.

In this other example of a pneumatic tire, since the width direction sipe 16A is formed in each block 11A, the tire width direction edge component can be guaranteed, and the on-snow braking performance and on-snow traction performance can be improved. The drainage performance can also be enhanced, and the wet performance can be guaranteed. Furthermore, in this other example of a pneumatic tire, since the width direction sipe 16A and the connecting narrow groove 15A intersect, a guarantee of edge components and an improvement in drainage performance can be achieved while suppressing a great decrease in rigidity of the block 11A and a reduction in the tire ground contact area as compared to when the width direction sipe 16A intersects the first cutaway groove 13A or the second cutaway groove 14A.

From the perspective of sufficiently suppressing a reduction in the rigidity of the block 11A and sufficiently guaranteeing the tire ground contact area, the groove depth of the terminating side of the first cutaway groove 13A and the second cutaway groove 14A (the minimum groove depth) is preferably 3 mm or less. From the perspective of forming a snow column of sufficient volume in the first cutaway groove 13A and the second cutaway groove 14A, the groove depth of the terminating side of the first cutaway groove 13A and the second cutaway groove 14A (the minimum groove depth) is preferably 1 mm or more.

From the perspective of grabbing sufficient snow at the lateral groove 5 side to enhance the snow column shear force, the groove depth of the opening side of the first cutaway groove 13A and the second cutaway groove 14A (the maximum groove depth) is preferably 5 mm or more. From the perspective of suppressing a great decrease in rigidity of the block 11A, the groove depth of the opening side of the first cutaway groove 13A and the second cutaway groove 14A (the maximum groove depth) is preferably 8 mm or less.

Apart from the above-described structure, this other example of a pneumatic tire may be structured similarly to the above example of a pneumatic tire, for example with respect to the width, length, angle, and shape of each groove.

Embodiments of the present invention have been described with reference to the drawings, yet a pneumatic tire according to the present invention is not limited to the above example and other example. A pneumatic tire according to the present invention may be modified as necessary. Specifically, a pneumatic tire according to the present invention may have a line-symmetric pattern centered on the tire equator.

EXAMPLES

The following describes the present invention in further detail by way of examples, yet the present invention is not limited in any way to the following examples.

Example 1

195/65R15 size pneumatic tires having the specifications listed in Table 1 and including the tread surface 100 with the structure shown in FIG. 1 were produced, and performance was evaluated with the method below. Table 1 lists the results.

Note that the specifications for the lateral grooves listed in Table 1 are the specifications for the lateral grooves 5 defining the blocks 11.

Comparative Example 1

195/65R15 size pneumatic tires having the specifications listed in Table 1 and including the tread surface with the structure shown in FIG. 5 were produced, and performance was evaluated with the method below. Table 1 lists the results.

<On-Snow Braking Performance>

The produced tires were mounted onto rims with a rim size of 15×6J, internal pressure was set to 200 kPa, and the tires were mounted on a vehicle. On a road with compacted snow, full braking was applied at a speed of 40 km/h. The braking distance until coming to rest was measured, and the average deceleration was calculated from the speed before braking and the braking distance. The average deceleration was converted to an index, with the value of Comparative Example 1 as 100. In Table 1, a larger value indicates superior friction characteristics of the tire and better on-snow braking performance.

<On-Snow Traction Performance>

The produced tires were mounted onto rims with a rim size of 15×6J, internal pressure was set to 200 kPa, and the tires were mounted on a vehicle. At a speed of 10 km/h on a road with compacted snow, the accelerator was depressed, the time required to accelerate to a speed of 45 km/h was measured, and the average acceleration was calculated. The average acceleration was converted to an index, with the value of Comparative Example 1 as 100. In Table 1, a larger value indicates superior friction characteristics of the tire and better on-snow traction performance.

<On-Snow Steering Stability>

The produced tires were mounted onto rims with a rim size of 15×6J, internal pressure was set to 200 kPa, and the tires were mounted on a vehicle. A professional driver then comprehensively evaluated the performance for starting, running straight, and steering on a road with compacted snow. The comprehensive evaluation was converted to an index, with the value of Comparative Example 1 as 100. In Table 1, a larger value indicates better on-snow steering stability and superior on-snow turning performance and the like.

TABLE 1

Figure 5:
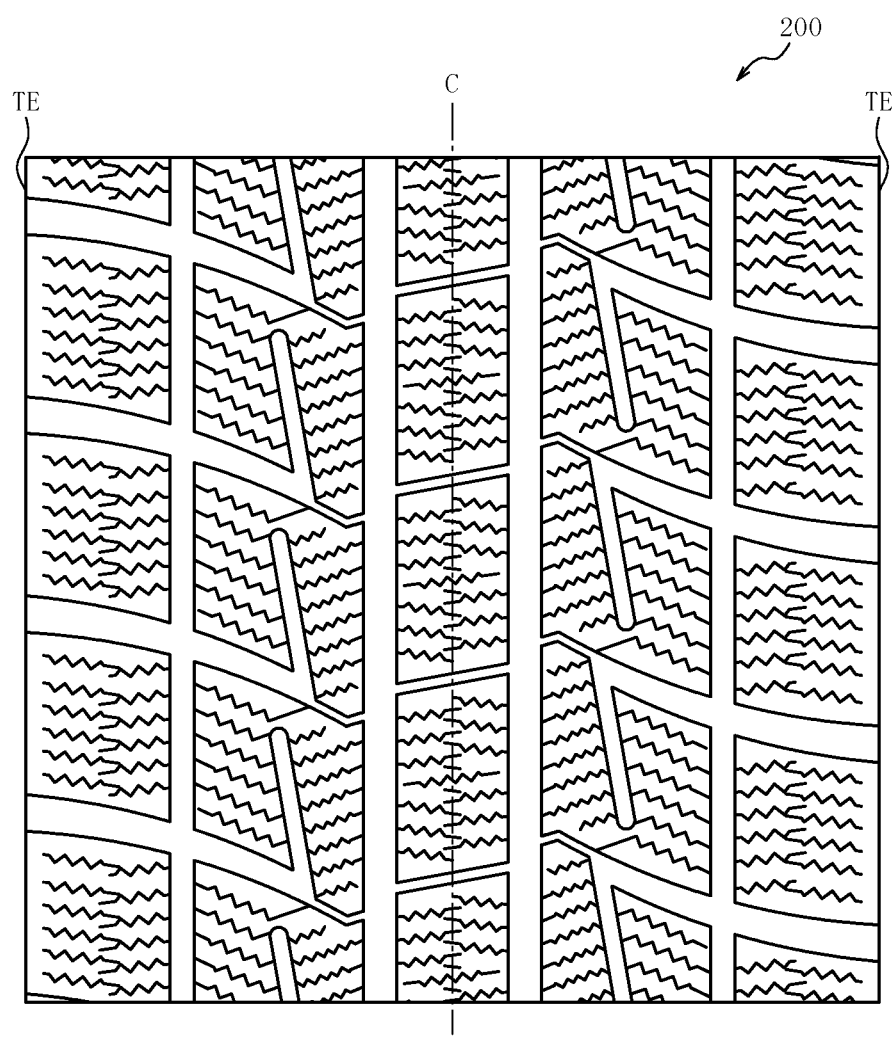
FIG. 5 is a development view of a portion of the tread of a pneumatic tire according to a comparative example.

|  | Comparative Example 1 | Example 1 |
|---|---|---|
| Tread surface shape | FIG. 5 | FIG. 1 |
| Negative ratio [%] | 28.0 | 28.6 |
| Cutaway groove width [mm] *1 | — | 3.0 |
| Angle formed by lateral groove and cutaway groove [°] | — | 90 |
| Lateral groove width [mm] | — | 5.0 to 7.0 |
| Connecting narrow groove width [mm] | — | 1.0 |
| On-snow braking performance | 100 | 120 |
| On-snow traction performance | 100 | 123 |
| On-snow steering stability | 100 | 115 |

*1: First cutaway groove and second cutaway groove have the same shape in Example 1

Table 1 shows that the tire of Example 1 has better on-snow performance than the tire of Comparative Example 1.

INDUSTRIAL APPLICABILITY

According to the present invention, a pneumatic tire with improved on-snow performance, such as on-snow braking performance, on-snow traction performance, on-snow turning performance, and the like, can be provided.

REFERENCE SIGNS LIST

1: First main groove
2: Second main groove
3: Circumferential thick groove
4: Circumferential narrow groove
5: Lateral groove
6: Lug groove
7: Central lateral groove
8: Bent lateral groove
9: Lug groove
10, 10A: Block row
11, 11A: Block
12: Sipe
13, 13A: First cutaway groove
14, 14A: Second cutaway groove
15, 15A: Connecting narrow groove
16A: Width direction sipe
17A: Third cutaway groove
18A: Fourth cutaway groove
20: Shoulder block row
21: Shoulder block
22: Lateral sipe
23: Longitudinal sipe
30: Central block row (land portion row)
31: Central block
32: Sipe
33: Extension lateral groove
40, 40A: Arrow feather block row
41, 41A: Arrow feather block
42, 42A: First sipe
43, 43A: Second sipe
44: Tire circumferential protrusion
50: Shoulder block row
51: Shoulder block
52: Lateral sipe
53: Longitudinal sipe
100, 100A: Tread surface

The invention claimed is:

1. A pneumatic tire comprising, in at least a portion of a tread surface located between both tread ends:
one or more main grooves extending in a tire circumferential direction; and
a plurality of lateral grooves extending in a tire width direction between the main grooves and/or between the main groove and the tread end,
the main grooves and the lateral grooves defining a block row formed by a plurality of blocks, at least one sipe being disposed in each block,
each block having formed therein:
a first cutaway groove with one end opening into a lateral groove located on one side of the block in the tire circumferential direction and the other end terminating within the block;
a second cutaway groove with one end opening into a lateral groove located on the other side of the block in the tire circumferential direction and the other end terminating within the block;
a connecting narrow groove having a groove width narrower than that of the first cutaway groove and the second cutaway groove and connecting the first cutaway groove and the second cutaway groove; and
a rigidity of the block increases from an opening side of the first cutaway groove towards a terminating side of the first cutaway groove and increases from an opening side of the second cutaway groove towards a terminating side of the second cutaway groove.

2. The pneumatic tire according to claim 1, wherein between adjacent blocks in the tire circumferential direction, the groove width centerline of the first cutaway groove and the groove width centerline of the second cutaway groove are located along the same line.

3. The pneumatic tire according to claim 1, wherein a groove depth of the first cutaway groove and the second cutaway groove decreases from the opening side towards the terminating side.

4. The pneumatic tire according to claim 1, wherein each block includes a width direction sipe extending in the tire width direction and intersecting the connecting narrow groove.

5. The pneumatic tire according to claim 1, wherein
the first cutaway groove and the second cutaway groove extend at an inclination in a same direction with respect to the tire circumferential direction, and
the connecting narrow groove extends at an inclination in an opposite direction with respect to the tire circumferential direction than the first cutaway groove and the second cutaway groove.

6. The pneumatic tire according to claim 1, further comprising:
a land portion row, on the tread surface, adjacent to the block row with the main groove therebetween, wherein
in a portion of the land portion row located along an extension line of the lateral grooves, an extension lateral groove is formed with one end opening into the main groove and the other end terminating within the land portion row.

7. The pneumatic tire according to claim 1, wherein
the first cutaway groove extends in a direction orthogonal to the lateral groove located on one side of the block in the tire circumferential direction, and
the second cutaway groove extends in a direction orthogonal to the lateral groove located on the other side of the block in the tire circumferential direction.

8. The pneumatic tire according to claim 1, wherein
a shape of the tread surface from a tire equator to a tread end located on one side in the tire width direction differs from a shape of the tread surface from the tire equator to a tread end located on the other side in the tire width direction, and
each block is formed on the one side in the tire width direction of the tire equator.

9. The pneumatic tire according to claim 1, wherein
by one or both of changing the rubber composition used in the block and varying the density of the sipes formed in the block, the rigidity of the block is increased from the opening side of the first cutaway groove towards the terminating side of the first cutaway groove and from the opening side of the second cutaway groove towards the terminating side of the second cutaway groove.

10. A pneumatic tire comprising, in at least a portion of a tread surface located between both tread ends:
one or more main grooves extending in a tire circumferential direction: and
a plurality of lateral grooves extending in a tire width direction between the main grooves and/or between the main groove and the tread end,
the main grooves and the lateral grooves defining a block row formed by a plurality of blocks, at least one sipe being disposed in each block,
each block having formed therein:

a first cutaway groove with one end opening into a lateral groove located on one side of the block in the tire circumferential direction and the other end terminating within the block;

a second cutaway groove with one end opening into a lateral groove located on the other side of the block in the tire circumferential direction and the other end terminating within the block;

a connecting narrow groove having a groove width narrower than that of the first cutaway groove and the second cutaway groove and connecting the first cutaway groove and the second cutaway groove; and a groove depth of the first cutaway groove and the second cutaway groove decreases from the opening side towards the terminating side.

11. The pneumatic tire according to claim 10, wherein between adjacent blocks in the tire circumferential direction, the groove width centerline of the first cutaway groove and the groove width centerline of the second cutaway groove are located along the same line.

12. The pneumatic tire according to claim 10, wherein each block includes a width direction sipe extending in the tire width direction and intersecting the connecting narrow groove.

13. The pneumatic tire according to claim 10, wherein
the first cutaway groove and the second cutaway groove extend at an inclination in a same direction with respect to the tire circumferential direction, and
the connecting narrow groove extends at an inclination in an opposite direction with respect to the tire circumferential direction than the first cutaway groove and the second cutaway groove.

14. The pneumatic tire according to claim 10, further comprising:
a land portion row, on the tread surface, adjacent to the block row with the main groove therebetween, wherein
in a portion of the land portion row located along an extension line of the lateral grooves, an extension lateral groove is formed with one end opening into the main groove and the other end terminating within the land portion row.

15. The pneumatic tire according to claim 10, wherein
the first cutaway groove extends in a direction orthogonal to the lateral groove located on one side of the block in the tire circumferential direction, and
the second cutaway groove extends in a direction orthogonal to the lateral groove located on the other side of the block in the tire circumferential direction.

16. The pneumatic tire according to claim 10, wherein
a shape of the tread surface from a tire equator to a tread end located on one side in the tire width direction differs from a shape of the tread surface from the tire equator to a tread end located on the other side in the tire width direction, and
each block is formed on the one side in the tire width direction of the tire equator.

17. A pneumatic tire comprising, in at least a portion of a tread surface located between both tread ends:
one or more main grooves extending in a tire circumferential direction; and
a plurality of lateral grooves extending in a tire width direction between the main grooves and/or between the main groove and the tread end,
the main grooves and the lateral grooves defining a block row formed by a plurality of blocks, at least one sipe being disposed in each block,
each block having formed therein:
a first cutaway groove with one end opening into a lateral groove located on one side of the block in the tire circumferential direction and the other end terminating within the block;
a second cutaway groove with one end opening into a lateral groove located on the other side of the block in the tire circumferential direction and the other end terminating within the block;
a connecting narrow groove having a groove width narrower than that of the first cutaway groove and the second cutaway groove and connecting the first cutaway groove and the second cutaway groove; and
a shape of the tread surface from a tire equator to a tread end located on one side in the tire width direction differs from a shape of the tread surface from the tire equator to a tread end located on the other side in the tire width direction, and
each block is formed on the one side in the tire width direction of the tire equator.

18. The pneumatic tire according to claim 17, wherein between adjacent blocks in the tire circumferential direction the groove width centerline of the first cutaway groove and the groove width centerline of the second cutaway groove are located along the same line.

19. The pneumatic tire according to claim 17, wherein each block includes a width direction sipe extending in the tire width direction and intersecting the connecting narrow groove.

20. The pneumatic tire according to claim 17, wherein
the first cutaway groove and the second cutaway groove extend at an inclination in a same direction with respect to the tire circumferential direction, and
the connecting narrow groove extends at an inclination in an opposite direction with respect to the tire circumferential direction than the first cutaway groove and the second cutaway groove.

21. The pneumatic tire according to claim 17, further comprising:
a land portion row, on the tread surface, adjacent to the block row with the main groove therebetween, wherein
in a portion of the land portion row located along an extension line of the lateral grooves, an extension lateral groove is formed with one end opening into the main groove and the other end terminating within the land portion row.

22. The pneumatic tire according to claim 18, wherein
the first cutaway groove extends in a direction orthogonal to the lateral groove located on one side of the block in the tire circumferential direction, and
the second cutaway groove extends in a direction orthogonal to the lateral groove located on the other side of the block in the tire circumferential direction.

* * * * *